United States Patent

Miyachi

[11] Patent Number: 6,108,492
[45] Date of Patent: Aug. 22, 2000

[54] REMOTE MONITORING SYSTEM

[75] Inventor: Hiroki Miyachi, Irvine, Calif.

[73] Assignee: Toshiba America Information Systems, Irvine, Calif.

[21] Appl. No.: 08/800,859

[22] Filed: Feb. 14, 1997

[51] Int. Cl.[7] .................................................. B41B 15/00
[52] U.S. Cl. ................................................. 395/114; 399/8
[58] Field of Search ...................... 395/183.22, 184.01, 395/828; 399/8, 9; 340/505, 506, 511, 518, 521, 825.06, 825.08, 870.11; 364/474.11, 474.16, 474.17, 474.21; 376/216, 259

[56] References Cited

U.S. PATENT DOCUMENTS

| | | | |
|---|---|---|---|
| 4,186,299 | 1/1980 | Batchelor | 399/77 |
| 4,583,834 | 4/1986 | Seko et al. | 399/8 |
| 5,057,866 | 10/1991 | Hill, Jr. et al. | 399/8 |
| 5,077,582 | 12/1991 | Kravette et al. | 399/8 |
| 5,084,875 | 1/1992 | Weinberger et al. | 395/183.22 |
| 5,184,179 | 2/1993 | Tarr et al. | 399/8 |
| 5,214,772 | 5/1993 | Weinberger et al. | 395/184.01 |
| 5,227,121 | 7/1993 | Scarola et al. | 376/216 |
| 5,265,131 | 11/1993 | Scarola et al. | 376/259 |
| 5,267,278 | 11/1993 | Scarola et al. | 376/259 |
| 5,271,045 | 12/1993 | Scarola et al. | 376/216 |
| 5,305,055 | 4/1994 | Ebner et al. | 399/9 |
| 5,333,286 | 7/1994 | Weinberger et al. | 395/184.01 |
| 5,353,399 | 10/1994 | Kuwamoto et al. | |
| 5,361,265 | 11/1994 | Weinberger et al. | 395/184.01 |
| 5,365,310 | 11/1994 | Jenkins et al. | 399/8 |
| 5,384,622 | 1/1995 | Hirata et al. | 399/8 |
| 5,440,301 | 8/1995 | Evans | 340/870.11 |
| 5,446,672 | 8/1995 | Boldys | 364/474.16 |
| 5,485,142 | 1/1996 | Stute et al. | 340/506 |
| 5,491,473 | 2/1996 | Gilbert | 340/870.01 |
| 5,493,287 | 2/1996 | Bane | 340/825.52 |
| 5,502,543 | 3/1996 | Aboujaoude | 399/8 |
| 5,521,848 | 5/1996 | Bayne et al. | 340/679 |
| 5,537,626 | 7/1996 | Kraslavsky et al. | 395/828 |

FOREIGN PATENT DOCUMENTS

| | | |
|---|---|---|
| 0 745 929 A1 | 12/1996 | European Pat. Off. |
| 0 749 065 A1 | 12/1996 | European Pat. Off. |

OTHER PUBLICATIONS

Hayes, Frank; "The Printers Talk Back", BYTE, Dec. 1993 (vol. 18, No. 13), pp. 103–104, 106, 108, 110.
Ricoh Lan XP Highspeed Network Printing System 1998.
Cannon Network Document Empowerment 1998.
Konica at Comdex Fall Digital products Exhibitions 1998.
Marketing documents related to Ricoh Lan XP, Nov. 1996.
Marketing documents related to Canon GP 200F, Nov. 1996.
Marketing documents related to Canon GP 30F, Nov. 1996.
Marketing documents related to: Konica 7050, 7728, 9715FP, 9615FP, MD System, QScan Film Scanner, EV–Jetcolor, Nov. 1996.
Technical documents related to: Multifunction Peripheral Interface Standard, Level 1, May 7, 1996.
Information Document related to: DiaSys Communications, Feb. 13, 1997.

*Primary Examiner*—Amelia Au
*Assistant Examiner*—Samir Ahmed
*Attorney, Agent, or Firm*—Steven C. Sereboff; Fred C. Hernandez

[57] ABSTRACT

A multifunction peripheral periodically stores its status information and a Host periodically receives this status information and stores it in a database in the Host. A technician may select some or all of the information to be provided to the technician on the occurrence of a number of trigger conditions. The technician may set the trigger conditions from any of the reportable status conditions. The Host automatically will connect to a remote monitoring computer designated by the technician and provide the selected information. The Host can also save the selected information to a removable storage medium.

26 Claims, 5 Drawing Sheets

REMOTE MONITORING SYSTEM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure, as it appears in the patent and Trademark Office patent files or records, but otherwise reserves all copyright and trade dress rights whatsoever.

BACKGROUND OF THE INVENTION

1. Field of the Invention

The present invention relates generally to methods of scheduling and facilitating maintenance and repair of electronic equipment, and more particularly to devices such as multifunction peripherals which have advanced self-monitoring capabilities.

2. Description of Related Art

In a typical networked multi-user computer environment, a number of individual workstations are linked together through a network, usually a local area network (LAN). Also linked on the LAN are one or more peripheral devices such as printers, facsimile machines, scanners or plotters. One or more file servers are also linked to the network and serve to manage allocation of the devices to workstations which request the use of the devices. The allocation procedures typically involve accepting requests, determining the address of the device requested, maintaining queues, establishing priorities and relaying data from the workstation to the device.

Typically when a workstation user wishes to determine the status of a device that is networked on a LAN, the method available depends upon the intelligence of the device. The earlier generation of peripherals were "unintelligent," or perhaps, better "uncommunicative." They accepted data from the LAN and processed it according to instructions, but were incapable of relaying status information back to the LAN. A workstation user, concerned about the status of a device to which he or she had sent a job, would have to leave the workstation to physically examine the device.

A server, such as a file server or a print server, might be able to provide some information regarding the status of a print job. However, this status information related to the status of the print job in a print queue, and the print queue was neither created, maintained nor serviced by the printer. If a print job was removed from the print queue, one could infer that the printer was handling the print job. However, the status of the print job as it was handled by the printer could not be ascertained. For example, absence of a print job from the print queue could mean that the print job was complete, or it could also mean that the printer had received the print job into its buffer and was still processing the print job. Other features of such a print queue manager were reprioritization of print jobs and deletion of print jobs.

More recently, peripheral devices such as printers have become available which are able to determine and relay information concerning their status through a communications port, such as a network interface card (NIC) or a printer (LPT) port. Thus, information concerning the printer's such as its device information (the manufacturer, command set and model of printer), the identity of the job it was currently processing, the status of its paper bins, ink supply, etc. which might be displayed on the printer's display panel, might be also relayed to a computer linked to the peripheral devices through a communications link. An example of this is the Lexmark Optra printer which provides identification data as well as other information as to status. However, querying the device and performing status checks slows the performance of the printer.

More recently, peripheral devices have become available which are able to perform a number of related functions. These devices are known as multifunction peripherals (MFPs).

The Telecommunication Industry Association (TIA) has provided an MFP interface standard known as the IS-650 Multifunction Peripheral Industry Interface Standard, Level 1 (MFPI-1) specification version 5.5. According to this standard, an MFP is:

> Computer equipment used to scan, print, facsimile transmit, and/or copy documents. It also may have the capability to provide data modem and other voice telephony services. The MFP may be an integrated unit or may be several discrete units that are interconnected on the same communication channel to the Host or interconnected using several different channels. One or more of the subsystems may be omitted from the MFP.

A "Host" is any terminal or computer capable of providing commands and data to operate a peripheral. In practice, a Host is a computer of any size, or a group of network nodes on a given local area network. A "subsystem" is one of several logical peripheral units, such as printer, scanner, fax-data-voice (FDV) modem, internal memory, stand-alone controller (SAC), operator console and others which may exist in the MFP. The Host and the MFP communicate through a "channel."

An MFP can operate in stand-alone mode, wherein two or more subsystems are used without interaction with the Host. One example of this is copying. Stand-alone operations may occur at the same time that the Host is accessing a different subsystem for a Host-controlled operation.

In a networked system where many workstations are sharing peripherals, the use of a multifunction peripheral is a mixed blessing. On the one hand, rather than providing, for example, two different scanner functions (one for reading documents for facsimile transmission, one for reading documents for copying) and three different printing functions (one for printing computer generated documents, one for printing documents received through facsimile transmission, and one for printing documents that have been scanned in for copying), a single scanning function and a single printing function perform the work of printer, copier and facsimile machine. On the other hand, the single multifunction peripheral is used at least as often as all of the individual devices would have been used alone. Previously, where there was one user wishing to print a document, one user wishing to transmit a document via facsimile, and one user wishing to copy a document, each would ordinarily each have directed his or her task to a separate machine, and thus not interfere with one another. If any one of these devices was inoperable, the others could perform unimpeded. With a single machine performing all three functions (in our example), maintenance and prompt repairs are more important to ensuring the productivity enhancing capabilities and cost savings of the MFPs.

It is important in the operation of complex electronic equipment, such as MFPs, to maintain the efficiency and productivity of the machine. Machine downtime due to various conditions such as break-downs, malfunctions and errors due to normal wear and tear severely impact machine productivity. In addition, locations with multiple machine operations are often without an immediately available repair and maintenance technician. The machine may be in a geographically remote location, or a responsible technician may be working on another machine. It is important for efficiency to reduce machine down time and to improve the efficiency of technician time spent in monitoring and correcting the machine operation at a specific location.

There has been general recognition of the need to notify someone when a machine needs relatively minor attention. For example, notification methods and systems abound for replenishment and exchange of expendable supplies, parts and the like. These include warning systems which sounds an acoustic warning when any one of a given set of running conditions is exceeded or departed from. In other systems, a transmitter coupled to the machine operates to separately sense different conditions of the machine and transmits separate signals corresponding to the sensed condition of the machine. However, as mentioned, these systems are generally directed to notifying a user or key operator of conditions which can be handled by them.

Furthermore, these systems generally add considerable expense to the machines. The benefits of remote monitoring may not be desired by all purchasers of the machines. Thus, add-in boards and add-on devices are typically provided only when purchased separately. Because of the high cost of development of the special-purpose devices and the limited market size, typical remote monitoring systems are expensive. Because these devices are separate from the machine, they also are made of parts which themselves may malfunction. These devices also typically require separate power supplies.

It would be desirable, therefore, to minimize machine downtime and provide the capability of rapid technician response to machine requirements and for the technician to be able to pre-select the machine conditions requiring notice. It would also be desirable to be able to immediately alert a technician at a remote location for fast response and to be able to identify for the technician the status or condition of the machine that provided the notification.

It is an object of the present invention, therefore, to provide a new and improved technique for notification of a technician remote from a machine of the need for machine assistance. It is still another object of the present invention to notify a remote technician of the type of assistance required to maintain machine productivity. It is still another object of the present invention to allow the pre-setting of conditions demanding automatic notification to a remote technician. It is a further object to provide an efficient and inexpensive means for scheduling preventive maintenance. It is a further object of the invention to provide these benefits without requiring add-in boards or add-on devices, and by providing these capabilities at a modest incremental cost. These objects and others are provided by the system and method of the present invention.

SUMMARY OF THE INVENTION

The previously described objects are achieved in a data processing system comprising an MFP and a Host, wherein the MFP periodically stores its status information and the Host periodically receives this status information and stores it in a database in the Host. A technician may select some or all of the information to be provided to the technician on the occurrence of a number of trigger conditions. The technician may set the trigger conditions from any of the reportable status conditions. The Host automatically will connect to a remote monitoring computer designated by the technician and provide the selected information. The Host can also save the selected information to a removable storage medium.

Still further objects and advantages attaching to the device and to its use and operation will be apparent to those skilled in the art from the following particular description.

DESCRIPTION OF THE DRAWINGS

These and other advantages of the present invention are best understood with reference to the drawings, in which, in varying detail.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

Figure 1:
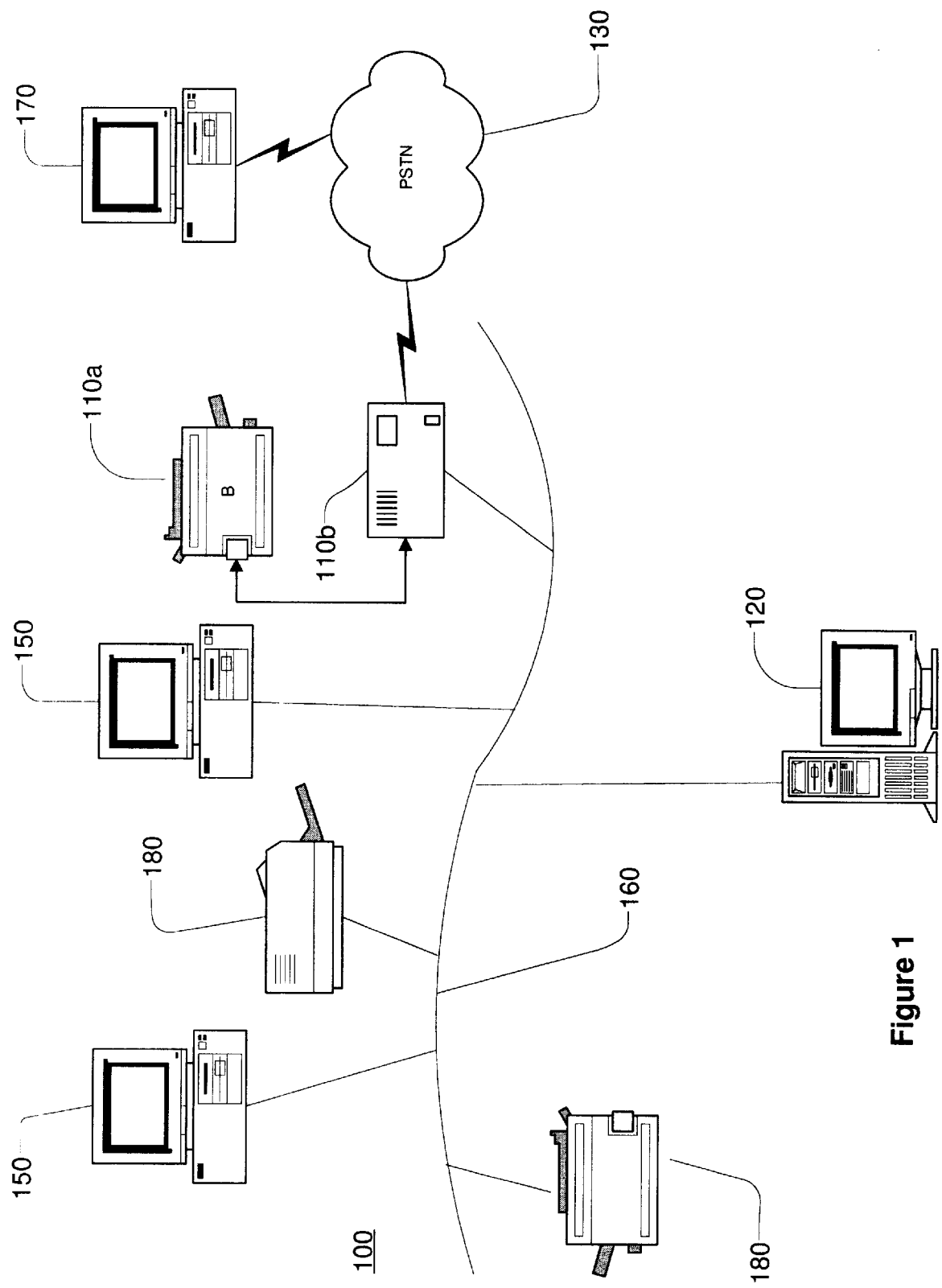
FIG. 1 is a block diagram of a LAN in accordance with the invention.

Referring now to FIG. 1, there is shown a block diagram of a LAN 100 in accordance with the invention. The LAN 100 includes a file server 120, workstations 150, printers 180 and a Host 110b coupled to one another via network communications lines 160. The file server 120 and workstations 150 are preferably those well known in the art, such as computers having Intel Corporation (Santa Clara, Calif.) microprocessors and running Microsoft Corporation (Redmond, Wash.) Windows operating systems. An MFP 110a is coupled to the Host 110b. The LAN 100 may also include hubs, routers and other devices (not shown).

There is also shown a remote monitoring computer 170 coupled to the Host 110b by a public switched telephone network 130. The remote monitoring computer 170 and public switched telephone network 130 are not part of the LAN 100. The remote monitoring computer 170 is preferably generally as known in the art having an Intel microprocessor and running Microsoft Windows, but also having special programs for interaction with the Host 110b as set forth below.

Before proceeding further, a few terms are defined. By "file server," it is meant a computer which controls access to file and disk resources on a network, and provides security and synchronization on the network through a network operating system. By "server," it is meant hardware or software which provides network services. By "workstation," it is meant a client computer which routes commands either to its local operating system or to a network interface adapter for processing and transmission on the network. A workstation may function as a server by including appropriate software, and may be for example, a print server, archive server or communication server. By "software" it is meant one or more computer interpretable programs and modules related and preferably integrated for performing a desired function. A "multifunction peripheral" is a peripheral which provides the functions of more than one peripheral, and typically provides printing and at least one of: copying, scanning and faxing.

Figure 2:
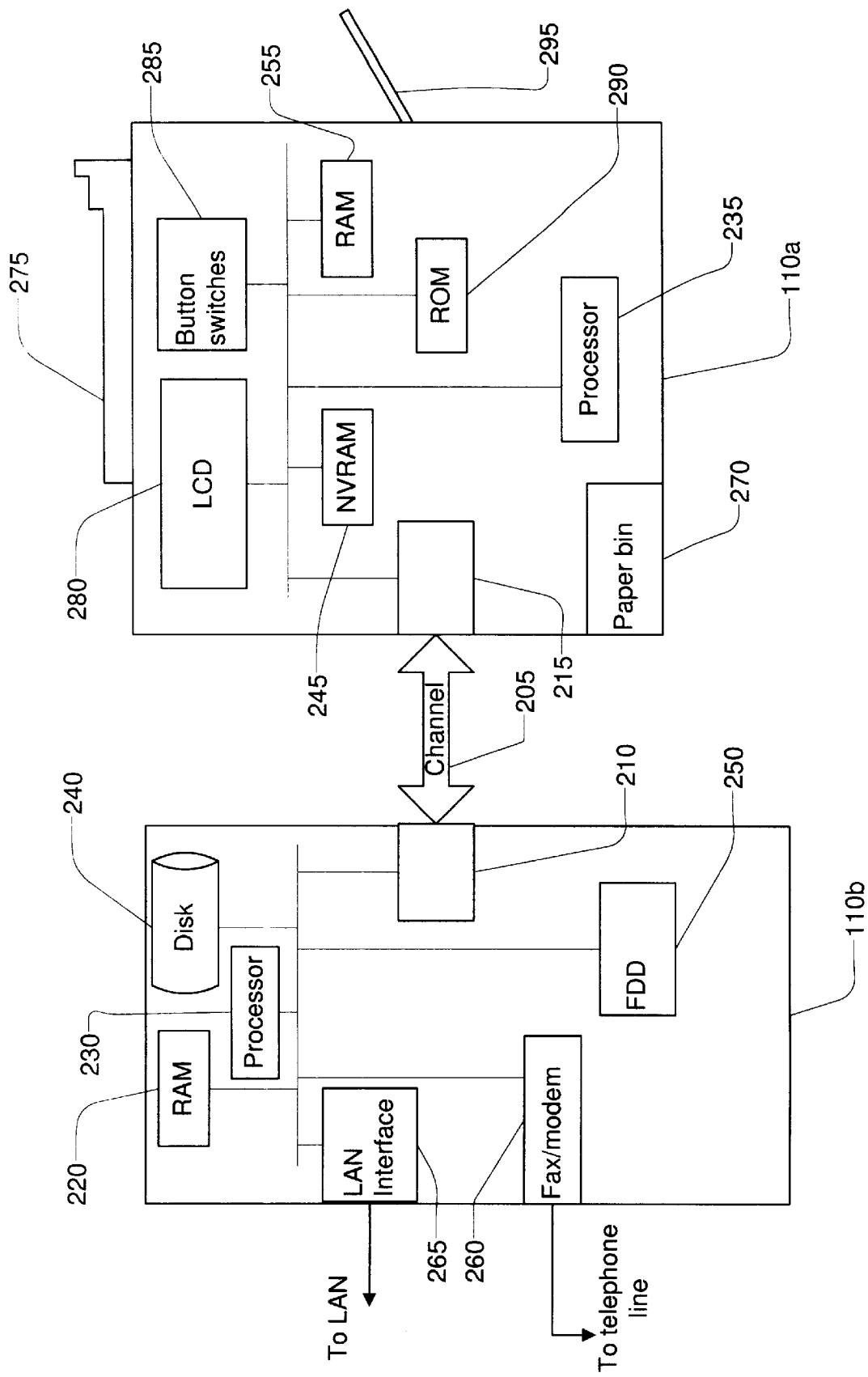
FIG. 2 is a block diagram of a data processing system including a Host and an MFP in accordance with the invention.

Turning now to FIG. 2, there is shown a block diagram of the data processing system comprising the MFP 110a and the Host 110b. The MFP 110a preferably comprises a high output digital copier having a communications interface 215 (preferably SCSI) and a hardware and software interface which allows the MFP 110a to receive rasterized print jobs from the Host 110b, manage the print jobs as well as its own copy jobs, and print the print jobs. The hardware includes a non-volatile data storage device 290 (preferably ROM or EPROM) and processor 235 in which programs are stored and run, respectively, for controlling the functions of the MFP 110a. The MFP 110a preferably also includes a short term rewritable data storage device 255 such as a RAM. The MFP 110a also includes a non-volatile rewritable data storage device 245 such as an NVRAM for storage of various information, include information regarding the status of operation of the MFP 110a. The MFP 110a includes standard components including automatic document feeder 275, paper bin 270 and paper output tray 295.

The MFP 110a includes a non-fixed display 280, preferably an LCD, and user input device 285, such as button switches. The MFP 110a has user interface software stored in the data storage device 290 which is responsible for displaying information on the display 280 and interpreting user inputs from the user input device 285.

The Host 110b preferably comprises a server such as a computer having an Intel processor 230 and running Microsoft Windows NT. To maximize efficiency, there is preferably a one-to-one correspondence between Hosts and MFPs. In conjunction with the processor 230, the Host 110b has a short term rewritable data storage device 220 (preferably RAM) and a non-volatile rewritable data storage device 240 (preferably a hard disk) as known in the art. The Host 110b further includes a communications interface 210 through which the Host 110b communicates with the MFP 110a through a channel 205. Preferably, the communications interface 210 is configured as a SCSI host. The Host 110b further preferably includes a fax/modem 260 for sending and receiving faxes via telephone lines 130 and for communicating with the remote monitoring computer 170. The Host 110b includes management software stored in the long term data storage device 240 for managing print jobs, fax jobs and scan jobs. The Host 110b rasterizes print jobs from the LAN 100 into print data (a form native to the MFP 110a) and transmits the print data to the MFP 110a via the communications channel 205. The Host preferably also has a removable storage device 250 such as a floppy drive which uses a removable storage medium such as a floppy disk (not shown).

Figure 3:
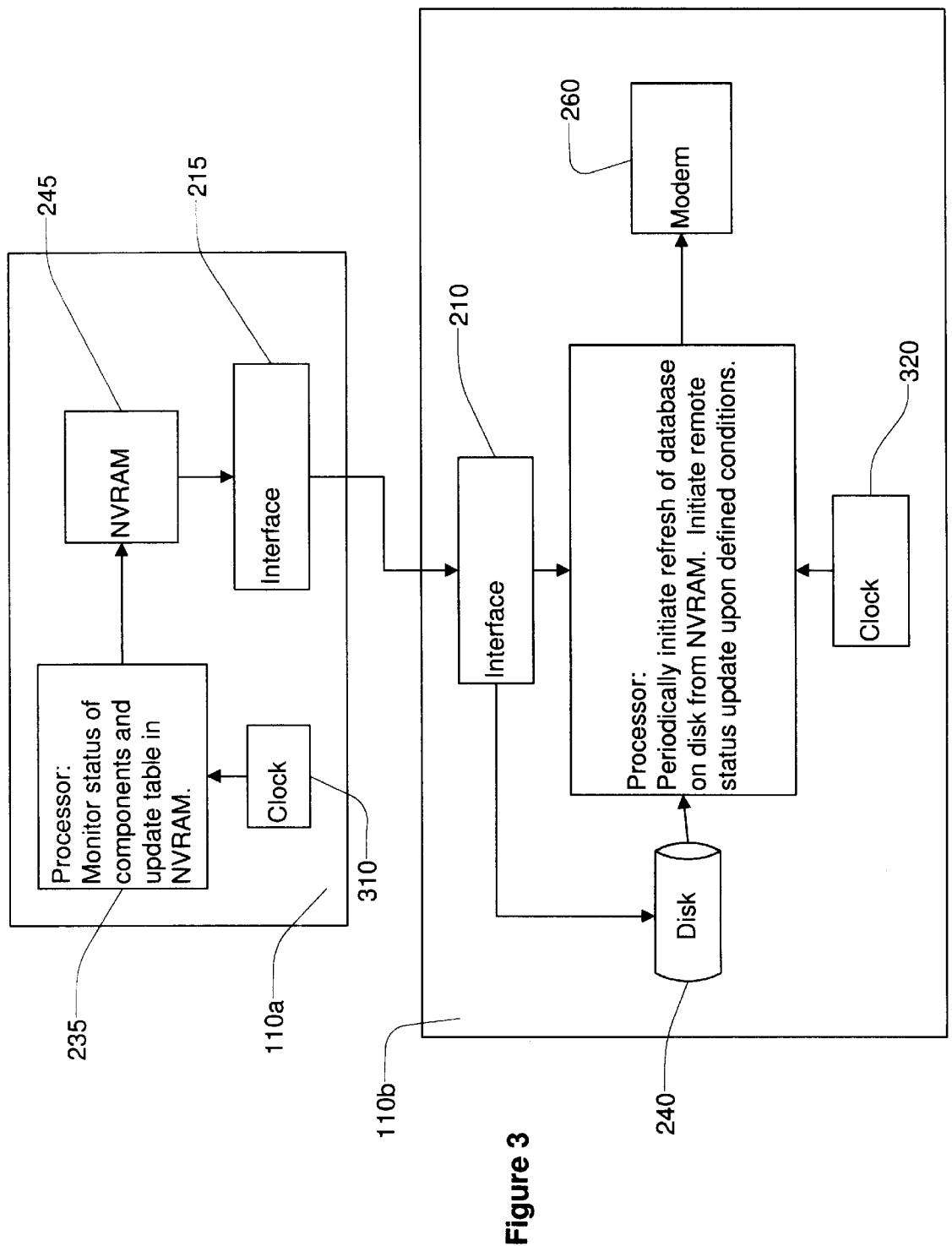
FIG. 3 is a conceptual block diagram of the data processing system of FIG. 2.

Referring now to FIG. 3, there is shown a conceptual block diagram of the data processing system of FIG. 2. The MFP's processor 235, under programmed control, is responsible for monitoring the condition of the MFP and updating a status information table stored in the non-volatile rewritable data storage device 245. The MFP's processor 235 operates in accordance with a clock 310 in the MFP 110a. Table 1 below sets forth a list of the MFP status conditions which are preferably included in the status table.

Preferably, the processor 235 monitors the user input device 285, and upon a predefined entry in the user input device 285, the processor 235 displays the selected status information from the data storage device 245 on the display 280.

TABLE 1

| Status Condition | Value Range | Initial Value | Comments |
|---|---|---|---|
| Date/Time setting | 12 chars | | YYMMDDhhmmss |
| Version | 0–2 | 0 | 0: EUR 1: US 2: JPN |
| Time mode (Auto clear) | 0–10 | 3 | 0: Disabled<br>1–10:<br>Setting × 15 seconds |
| Service personnel telephone number | 10 digits | | |
| PM counter setting value | 0–999,999 | 0 | |
| PM counter current value | 0–999,999 | 0 | |
| ADU/main unit cassette installation status | 0–2 | 0 | 0:Without ADU/<br>main unit cassette 1<br>1: Main unit cassette 1 installed<br>2: ADU installed |
| PFP installation status | 0 | 0 | 0: Without PFP<br>1: PFP 1<br>2: PFP 2<br>3: PFP 3 |
| MAX 9 | 0 | 0 | |
| Print priority order for interrupt copy and fax memory full | 0 | 0 | 0: Interrupt copy<br>1: Fax memory full |
| Electronic total counter | 0–999,999 | 0 | |
| A3/LD double count | 0 | 0 | |
| C7 counter | 0–3 | 0 | |
| Drum life counter | 0–999,999 | 0 | Reset only possible |
| Electric current time counter | 0–999,999 | 0 | Reset only possible |
| Fuser counter (synchronous with total counter) | 0–999,999 | 0 | Reset only possible |
| Developer counter | 0–999,999 | 0 | Reset only possible |
| Drum electric potential control (counter correction) | 0–1 | 1 | |
| Pre-run starting time | 0–15 | 6 | |
| Pre-run operation time | 0–24 | 2 | |
| Fixing temperature during printing | 0–24 | 18 | |
| Change amount of fixing temperature during PRINTING --> READY | 0–6 | 0 | |
| Fixing temperature in the power save state | 0–24 | 0 | |
| Fixing temperature for thick sheets | 0–4 | 0 | |
| Setting of transfer and sheet separation correction conditions | 0–3 | 0 | |
| Black strip between papers | 0–4 | 0 | |
| Drum electric potential control (temperature correction) | 0–1 | 1 | |
| Laser power correction values | 0–255 | 127 | |
| APS Carriage start timing | 0–15 | 0 | |
| ADF switchback | 0–1 | 0 | |
| Cassette priority selection | 0–6 | 0 | |
| Image mode default | 0–2 | 0 | |
| Photo mode setting | 0–1 | 0 | |
| Intensity default for photo mode | 0–1 | 0 | |
| Intensity default for standard mode | 0–1 | 0 | |
| Intensity default for text mode | 0–1 | 0 | |

TABLE 1-continued

| Status Condition | Value Range | Initial Value | Comments |
|---|---|---|---|
| Enlargement/reduction random interpolation | 0–1 | 0 | |
| Image mode default | 0–1 | 0 | |
| Photograph mode setting | 0–1 | 0 | |
| Intensity default for photograph mode | 0–1 | 0 | |
| Intensity default for standard mode | 0–1 | 0 | |
| Intensity default for text mode | 0–1 | 0 | |
| Smoothing (standard) | 0–1 | 0 | |
| Smoothing (text) | 0–1 | 0 | |
| ID code mode | 0–1 | 0 | |
| Secondary scan magnification adjustment | 0– | 0 | |
| Automatic two-sided mode | 0–2 | 0 | |
| APS priority selection | 0–2 | 0 | |
| SAPS mode | 0–2 | JPN: 0 US: 0 EUR: 1 | |
| ADF priority mode selection | 0–1 | 0 | |
| PM memory quantity secured | 0–1 | 0 | |
| Form registering | 0–1 | 0 | |
| Two-sided original document selection for books | 0–1 | 0 | |
| [USER] key original document size selection | 4–9 20–23 28–37 | 9 38 37 | |
| [USER] key paper size selection | 4–7 20–23 28–37 | 9 38 37 | |
| Manual feed auto start | 0–1 | 0 | |
| Date format | 0–2 | 0 | |
| Sorter mode priority selection | 0–3 | 0 | |
| Adjustment magnification during editing | 0–10 | 10 | |
| Input image position during continuous page copying | 0– | 0 | |
| Entry mode priority selection | 0 | 0 | |

Preferably, the processor 235 also utilizes a number of settings for the MFP's basic operating characteristics. Table 2 below sets forth a list of the preferred MFP 110*a* settings.

TABLE 2

| Status Condition | Value Range | Initial Value | Comments |
|---|---|---|---|
| Auto-toner automatic adjustment (heat roller lamp ON) | — | — | |
| Auto-toner sensor initial value adjustment | 0–255 | 127 | |
| Developing bias DC adjustment (Developing bias DC: ON) | 0–255 | 128 | |
| Grid voltage initial value adjustment (Main motor, discharger, charger, grid: ON) | 0–255 | 128 | |

TABLE 2-continued

| Status Condition | Value Range | Initial Value | Comments |
|---|---|---|---|
| Transfer transformer DC output, high Center and low adjustments | 0–255 | 160 | |
| Separation AC output, high, center and low adjustments | 0–255 | 128 | |
| Cleaner pre-discharging AC output adjustment | 0–255 | 128 | |
| Laser automatic adjustment | 0–255 | — | |
| Laser sharpness, minimum, maximum and center values | 0–255 | 127 | |
| Scanner secondary scan magnification | 0–255 | 127 | |
| Scanner secondary scan displacement | 0–255 | 127 | |
| CCD primary scan displacement | 0–255 | 128 | |
| Halogen lamp lighting voltage setting | 0–15 | 8 | |
| White shading value display | | — | |
| Original document edge image cut - Basic PPC | 0–255 | 127 | Basic PPC |
| Original document edge image cut - Expansion PPC | 0–255 | 127 | Expansion PPC |
| Original document edge void gradation | 0–255 | 128 | |
| Secondary scan magnification, main and resist motors speed fine adjustment | 0–255 | 127 | PPC |
| Laser firing position | 0–255 | 127 | |
| Margins - Basic and Expansion PPC | 0–255 | 127 | |
| Leading edge positions | 0–255 | 127 | |
| Aligning quantities | 0–255 | 127 | |
| Manual intensity fine adjustments | 0–255 | 127 | |
| Auto intensity fine adjustments | 0–255 | 127 | |
| User intensity center curve setting | [(−128)–(127)] × 17 | | |
| User intensity center curve selections | 0–15 | 0 | |
| Foundation cut quantity fine adjustments | 0–255 | 255 | |
| Black standard value offset quantities | 0–255 | 255 | |
| Range correction B/W standard values | 0–255 | 0 | |
| Foundation range width adjustments | 0–15 | 0 | |
| Gamma correction | | — | |
| Coefficient setting for LPF and HPF | 0–255 × 4 | 0 × 4 | |
| LPF and HPF settings for various enlargement/reduction modes | 0–255 | 0 | |
| Enlargement/reduction random interpolation | 0–63 | 0 | |
| During smoothing ON Halftone judgement threshold value | 0–255 | 13 | |

The Host 110*b* has its own clock 320. The Host's processor, operating in accordance with the clock 320, is responsible for periodically initiating a refresh of a status information database in the long term data storage device 240. This status information is obtained from the MFP 110*a* and stored in a database preferably in the non-volatile rewritable data storage device 240.

The Host's fax/modem 260 is used for communicating status information to the remote monitoring computer 170. The fax/modem 260 is also used for sending fax jobs from the workstations 150 or originating from the MFP 110a, as well as receiving faxes which are generally printed by the MFP 110a. Thus, the processor 230 also tests the status of the fax/modem 260 before use and preferably queues outbound traffic. Preferably, notification has a higher priority than outbound faxes.

Preferably, the Host 110b not only obtains the multifunction peripheral status information from the MFP's non-volatile rewritable data storage device 245 and stores this information in the database, but the processor 230, under programmed control also maintains in the database a history of this status information, including a log of significant operational events in the MFP 110a.

Furthermore, the Host 110b also preferably monitors and stores in the database information regarding the number of users who have submitted print and fax jobs, the number of print and fax jobs submitted per user, the average total print time for print and fax jobs over a selected time frame, version information of Host 110b software, and information concerning the Host's "health," status, resource allocation and usage statistics.

Another feature of the remote monitoring system is that the technician, when using the remote monitoring workstation 170 to connect with the Host 110b, can also modify some or all of the settings in Table 2 (depending on permissions granted). In addition, the remote monitoring workstation 170 can also be used to upload new versions of Host 110b software, including new versions of user interface information which are used by the Host 110b in conjunction with the MFP 110a.

Figure 4:
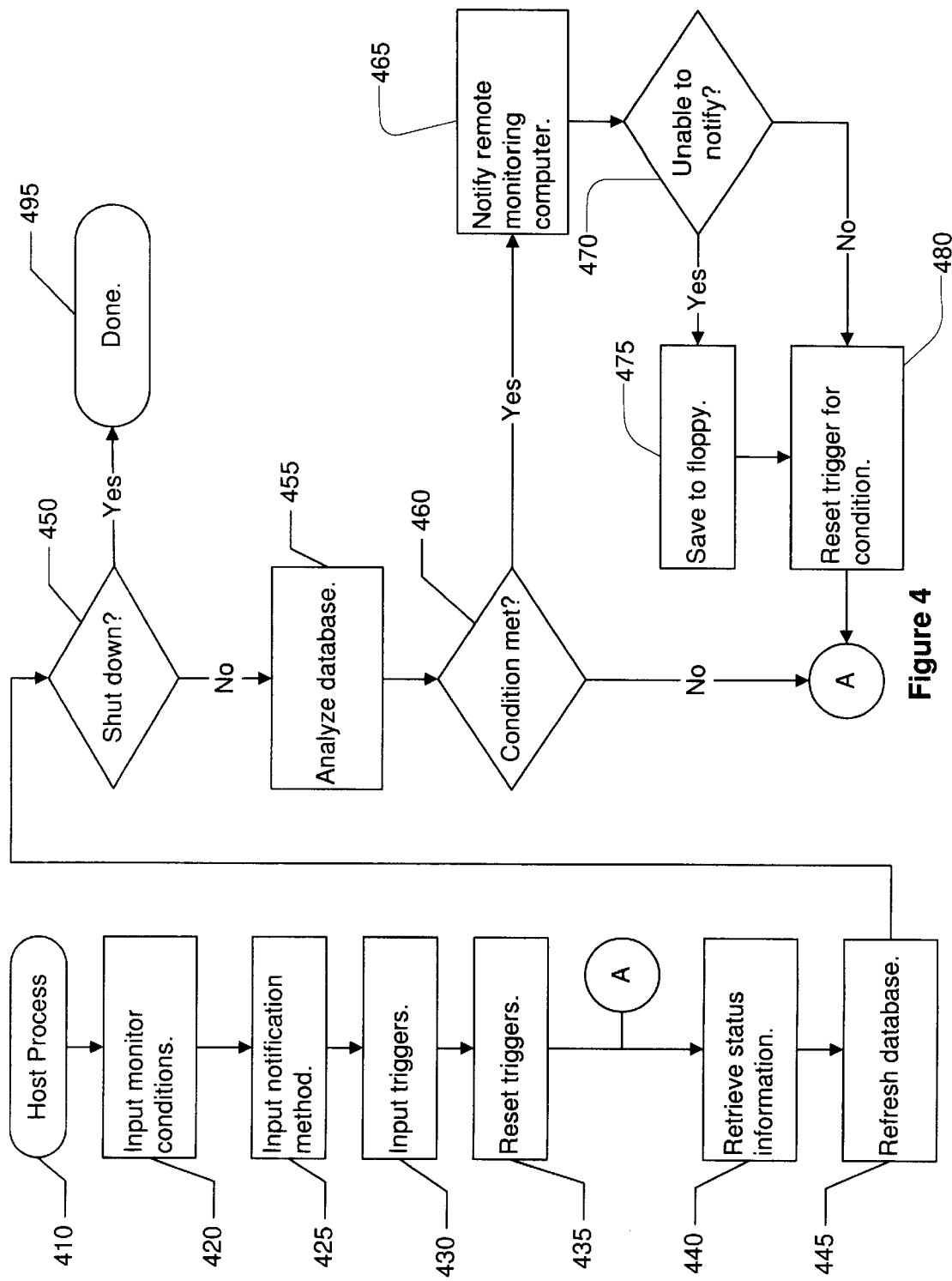
FIG. 4 is a flow chart of a Host process in accordance with the invention.

Referring now to FIG. 4, there is shown a flow chart of a process operating in the Host 110b in accordance with the invention. Preferably, the process is embodied as a program stored in the non-volatile rewritable data storage device 240 and loaded into and run by the processor 230.

After the program has been loaded (step 410), the program allows a technician to select a number of MFP status conditions to monitor (step 420). Preferably, this is accomplished by the technician accessing the Host 110b from a workstation 150 on the LAN 100 or the remote monitoring computer 170 via modem 260. Preferably, the technician may be notified of any of the status conditions in Table 1 and Table 2, and there is an option to provide the entire database.

In step 425 the technician is allowed to designate a notification method. This preferably comprises designating the telephone number of the remote monitoring computer 170, but might also include designating a workstation 150 on the LAN 100 to be notified. Preferably, saving to the removable storage medium may also be selected as the notification method.

Next, the program allows the technician to select a number of trigger conditions to trigger notification (step 430). Preferably, the technician may select any of the status conditions in Table 1 and Table 2 to be used in these trigger conditions. The technician preferably may select particular values at which a trigger condition is to be met. For example, the technician might want to be notified when the fuser counter reaches a particular value. Preferably, the technician may select an increment for notification, such as to be notified every time the fuser counter reaches another thousand counts.

In addition, the technician may select as a trigger condition an immediate call back. Such a trigger condition would be useful where the technician use the remote monitoring computer 170 through a long distance telephone connection, and desires the Host to initiate the call to reduce the technician's costs.

After the trigger conditions have been selected by the technician, the processor 230 preferably resets those trigger conditions needing to be reset (step 435). For example, incremental counters and temperature conditions are preferably reset. Once notification settings have been saved by the Host 110b (preferably to the non-volatile rewritable data storage device 240), the processor 230 begins a monitoring and notification loop.

The loop begins (step 440) with the Host's processor 230 periodically generating a signal to the MFP's processor 235 via the communications interface 210, the communications channel 205 and the communications interface 215 to request that the MFP's processor 235 to provide the status information stored in the data storage device 245. Preferably, this step 440 is performed at a predetermined frequency in accordance with the clock 310 and a predetermined setting.

Figure 5:
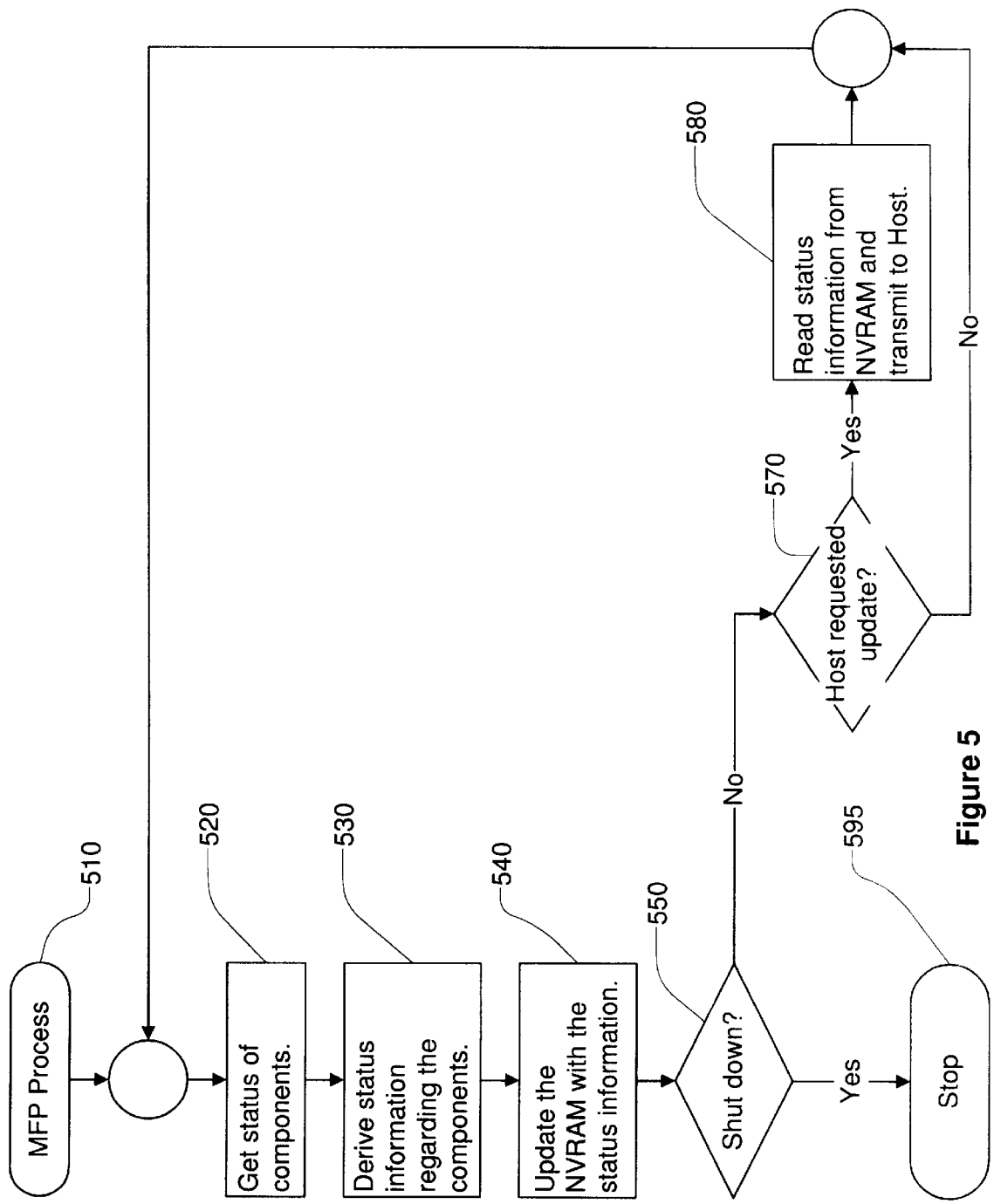
FIG. 5 is a flow chart of an MFP process in accordance with the invention.

Temporarily digressing now, the MFP's processor 235 is preferably also performing a programmed loop. Referring now to FIG. 5, there is shown a flow chart of an MFP 110a process in accordance with the invention. After the program is started (step 510), the processor 235 determines a condition of plural predetermined operating aspects of the MFP 110a (step 520). The processor 235 derives status information regarding the condition of the multifunction peripheral (step 540), and updates the table in the non-volatile rewritable data storage device 245 with the status information (step 540).

If the MFP 110a is to be shut down (step 550), the process will of course terminate (step 595). There may also be other reasons for stopping the process.

If the process is to continue, then in step 570 the processor 235 checks if the Host 110b has requested the current status information (in step 445 of FIG. 4). If so, then the processor 235 reads the status information from the data storage device 245 and transmits the status information via the communications interface 215 to the Hosts's processor 230. In either case, the loop continues by returning to step 520.

Return now to FIG. 4 and the program operating in the Host's processor 230, after the Host's processor 230 has generated the signal to the MFP's processor 235 to request the current status information (step 440), the Host's processor 230 uses this status information to update the Host's MFP status database stored in the data storage device 240 (step 445).

Like the MFP 110a, if the Host 110b is to be shut down (step 450), the process will of course terminate (step 495). There may also be other reasons for stopping the process.

If the process is to continue, then the processor 230 analyzes the status information database (step 455) and determines if any of the trigger conditions have been met (step 460). If not, then the loop continues at step 440.

Otherwise the processor 230 initiates a notification as indicated in the settings received in step 425 (step 465). Preferably, this comprises the Host 110b using its modem 260 for connecting to the remote monitoring computer 170 and uploading the status information selected by the technician. Preferably, the status information is provided to the remote monitoring computer 170 in ASCII format or in a format native to the database.

There may be occasions where the Host 110b is unable to complete notification of the remote monitoring computer 170 (step 470). In such a case, the Host 110b preferably stores the status information regarding the conditions the technician selected for monitoring on the removable storage medium (step 475).

After notifying the remote monitoring computer 170 (or saving to the removable storage medium), the processor 230 preferably resets those trigger conditions needing to be reset (step 480).

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A data processing system for printing print jobs originating from workstations on a computer network and for copying copy jobs, the data processing system comprising:
    (a) a multifunction peripheral for printing the print jobs and copying the copy jobs, the multifunction peripheral comprising a paper tray, a display, a user input device, a first processor, a first data storage device for multifunction peripheral program storage, a second rewritable data storage device for short term storage and a third non-volatile rewritable data storage device, a first communications interface and a first clock for generating a first clock signal to the first processor, wherein the multifunction peripheral programs include instructions for causing the first processor to:
        (i) determine an operating condition of plural predetermined aspects of the multifunction peripheral,
        (ii) derive status information regarding the operating condition of the multifunction peripheral,
        (iii) update the third non-volatile rewritable data storage device with the status information,
        (iv) read the status information from the third data storage device and transmit the status information via the first communications interface; and
    (b) a Host local to the multifunction peripheral for sending print jobs to the multifunction peripheral for printing, the Host comprising a second processor, a fourth rewritable non-volatile data storage device for storing Host programs and data and a fifth rewritable memory for short term storage, a second communications interface coupled to the communications interface of the multifunction peripheral by a communications channel, a third communications interface for communicating with a remote monitoring computer and a second clock for generating a second clock signal to the second processor, wherein the Host programs include an operating system and instructions for causing the second processor through the operating system to:
        (i) allow a remote technician to use the remote monitoring computer to select plural status conditions of the multifunction peripheral for the Host to monitor,
        (ii) allow the remote technician to use the remote monitoring computer to designate a notification method for the Host to notify the remote monitoring computer of the selected status conditions,
        (iii) allow the remote technician to use the remote monitoring computer to define in the Host plural trigger conditions to trigger notification by the Host of the selected status conditions to the remote monitoring computer,
        (iv) periodically generate a signal to the first processor via the second communications interface, the communications channel and the first communications interface to request that the first processor provide the multifunction peripheral status information stored in the third data storage device,
        (v) refresh a status information database in the fourth rewritable non-volatile data storage device from the status information received from the third data storage device in the multifunction peripheral, and
        (vi) analyze the status information database to detect if any of the selected trigger conditions have been met, and if so, then initiate a notification of the remote monitoring computer through the third communications interface in the manner designated by the remote technician for providing the status information regarding the status conditions the remote technician selected for monitoring.

2. The data processing system as set forth in claim 1, the Host further comprising a removable storage device and a removable storage medium, and if the Host is unable to connect with the remote monitoring computer, then the Host stores the status information regarding the status conditions the technician selected for monitoring on the removable storage medium.

3. The data processing system as set forth in claim 2, the removable storage medium comprising a floppy disk and the removable storage device comprising a floppy drive.

4. The data processing system as set forth in claim 1, wherein the third data storage device comprises an NVRAM.

5. The data processing system as set forth in claim 1, wherein the first data storage device further includes programs for causing the first processor to monitor the user input device, and upon a predefined entry in the user input device, to display the selected status information on the display.

6. The data processing system as set forth in claim 1, wherein the second processor sends the status information to the remote monitoring computer in ASCII format.

7. The data processing system as set forth in claim 1, wherein the second processor sends the status information to the remote monitoring computer in a database format.

8. The data processing system as set forth in claim 7, wherein the Host transmits the entire status information database to the remote monitoring computer.

9. The data processing system as set forth in claim 1, wherein the third communications interface comprises a modem.

10. The data processing system as set forth in claim 1, wherein the first communications interface and second communications interface comprise SCSI interfaces.

11. The data processing system as set forth in claim 1, wherein the database includes a history of multifunction peripheral events.

12. A method of notifying a remote monitoring computer of the status of a multifunction peripheral, the multifunction peripheral for printing print jobs and copying copy jobs, the multifunction peripheral comprising a paper tray, a display, a user input device, a first processor, a first data storage device for multifunction peripheral program storage, a second rewritable data storage device for short term storage and a third non-volatile rewritable data storage device, a first communications interface and a first clock for generating a first clock signal to the first processor, a Host local to the multifunction peripheral for sending print jobs to the multifunction peripheral for printing, the Host comprising a second processor, a fourth rewritable non-volatile data storage device for storing Host programs and data and a fifth rewritable memory for short term storage, a second communications interface coupled to the communications interface of the multifunction peripheral by a communications channel, a third communications interface for communicating with a remote monitoring computer and a second clock for generating a second clock signal to the second processor, the Host programs including an operating system, the method comprising:

(a) in the multifunction peripheral, performing the steps of:
  (i) determining an operating condition of plural predetermined aspects of the multifunction peripheral,
  (ii) deriving status information regarding the operating condition of the multifunction peripheral,
  (iii) updating the third non-volatile rewritable data storage device with the status information, and
  (iv) reading the status information from the third data storage device and transmit the status information via the first communications interface; and (b) in the Host, performing the steps of:
  (i) allowing a technician to remotely select plural status conditions of the multifunction peripheral to monitor,
  (ii) allowing the technician to remotely designate a notification method for the remote monitoring computer,
  (iii) allowing the technician to remotely select plural trigger conditions to trigger notification of the remote monitoring computer,
  (iv) periodically generating a signal to the first processor via the second communications interface, the communications channel and the first communications interface to request that first processor provide the multifunction peripheral status information stored in the third data storage device,
  (v) refreshing a status information database in the fourth rewritable non-volatile data storage device from the status information received from the third data storage device in the multifunction peripheral, and
  (vi) analyzing the status information database to detect if any of the trigger conditions have been met, and if so, then initiating a notification of the remote monitoring computer through the third communications interface for providing the status information regarding the status conditions the technician selected for monitoring.

13. The method of notifying a remote monitoring computer of the status of a multifunction peripheral as set forth in claim 12, the Host further comprising a removable storage device and a removable storage medium, the method further comprising, if the Host is unable to connect with the remote monitoring computer, then the Host storing the status information regarding the status conditions the technician selected for monitoring on the removable storage medium.

14. The method of notifying a remote monitoring computer of the status of a multifunction peripheral as set forth in claim 13, the removable storage medium comprising a floppy disk and the removable storage device comprising a floppy drive.

15. The method of notifying a remote monitoring computer of the status of a multifunction peripheral as set forth in claim 12, the method further comprising, in the multifunction peripheral, monitoring the user input device, and upon a predefined entry in the user input device, displaying the selected status information from the Host on the display.

16. The method of notifying a remote monitoring computer of the status of a multifunction peripheral as set forth in claim 12, further comprising, in the Host, sending the status information to the remote monitoring computer in ASCII format.

17. The method of notifying a remote monitoring computer of the status of a multifunction peripheral as set forth in claim 12, further comprising, in the Host, sending the status information to the remote monitoring computer in a database format.

18. The method of notifying a remote monitoring computer of the status of a multifunction peripheral as set forth in claim 17, wherein the Host transmits the entire status information database to the remote monitoring computer.

19. The method of notifying a remote monitoring computer of the status of a multifunction peripheral as set forth in claim 12, further comprising, in the Host, storing in the database a history of multifunction peripheral events.

20. A Host for use with a multifunction peripheral, wherein the Host is local to the multifunctional peripheral, the Host for sending print jobs to the multifunction peripheral for printing and providing status information from the multifunction peripheral to a remote monitoring computer, the Host comprising:

(a) a processor;
(b) a first rewritable memory for short term storage;
(c) a first communications interface coupled to the multifunction peripheral;
(d) a second communications interface for communicating with the remote monitoring computer;
(e) a second rewritable non-volatile data storage device for storing Host programs and data, the Host programs including an operating system and instructions for causing the processor through the operating system to:
  (i) allow a remote technician to use the remote monitoring computer to select plural status conditions of the multifunction peripheral for the Host to monitor,
  (ii) allow the remote technician use the remote monitoring computer to designate a notification method for the Host to notify the remote monitoring computer of the selected status conditions,
  (iii) allow the remote technician to use the remote monitoring computer to define in the Host plural trigger conditions to trigger notification by the Host of the selected status conditions to the remote monitoring computer,
  (iv) periodically generate a signal to the multifunction peripheral via the first communications interface to request that the multifunction peripheral provide the status information to the Host,
  (v) refresh a status information database in the second rewritable non-volatile data storage device from the status information received from the multifunction peripheral, and
  (vi) analyze the status information database to detect if any of the selected trigger conditions have been met, and if so, then initiate a notification of the remote monitoring computer through the third communications interface in the manner designated by the remote technician for providing the status information selected for monitoring by the remote technician.

21. The Host for use with a multifunction peripheral as set forth in claim 20, wherein the Host sends the status information to the remote monitoring computer in a database format.

22. The Host for use with a multifunction peripheral as set forth in claim 20, wherein the Host sends the status information to the remote monitoring computer in a database format.

23. A method of operating a Host local to a multifunction peripheral, to notify a remote monitoring computer of the status of a multifunction peripheral connected to the Host, the multifunction peripheral for printing print jobs and copying copy jobs, the Host for sending print jobs to the multifunction peripheral for printing, the Host comprising a processor, a first rewritable non-volatile data storage device for storing Host programs and data and a second rewritable memory for short term storage, a first communications interface coupled to the multifunction peripheral, and a second communications interface for communicating with a remote monitoring computer, the Host programs including an operating system, the method comprising:

(a) allowing a remote technician to use the remote monitoring computer to select in the Host plural status conditions of the multifunction peripheral to monitor;

(b) allowing the remote technician to use the remote monitoring computer to remotely designate in the Host a notification method for the remote monitoring computer;

(c) allowing the remote technician to use the remote monitoring computer to select in the Host plural trigger conditions to trigger notification of the remote monitoring computer;

(d) periodically requesting that the multifunction peripheral provide status information to the Host;

(e) refreshing a status information database in the first rewritable non-volatile data storage device from the status information received from the multifunction peripheral, and (f) analyzing the status information database to detect if any of the trigger conditions selected by the remote technician have been met, and if so, then initiating a notification of the remote monitoring computer through the second communications interface and providing the status information selected by the remote technician.

24. The method of operating a Host to notify a remote monitoring computer of the status of a multifunction peripheral connected to the Host as set forth in claim 23, further comprising, in the Host, sending the status information to the remote monitoring computer in a database format.

25. The method of operating a Host to notify a remote monitoring computer of the status of a multifunction peripheral connected to the Host as set forth in claim 23, further comprising, in the Host, sending the status information to the remote monitoring computer in ASCII format.

26. A computer program product comprising a computer usable medium having computer readable program code embodied therein for causing a Host local to a multifunction peripheral to:

(a) allow a remote technician to use the remote monitoring computer to select plural status conditions of the multifunction peripheral for the Host to monitor, (b) allow the remote technician use the remote monitoring computer to designate a notification method for the Host to notify the remote monitoring computer of the selected status conditions, (c) allow the remote technician to use the remote monitoring computer to define in the Host plural trigger conditions to trigger notification by the Host of the selected status conditions to the remote monitoring computer, (d) periodically generate a signal to the multifunction peripheral via the first communications interface to request that the multifunction peripheral provide the status information to the Host, (e) refresh a status information database in the second rewritable non-volatile data storage device from the status information received from the multifunction peripheral, and (f) analyze the status information database to detect if any of the selected trigger conditions have been met, and if so, then initiate a notification of the remote monitoring computer through the third communications interface in the manner designated by the remote technician for providing the status information selected for monitoring by the remote technician.

* * * * *